(No Model.)
C. D. REED.
CULTIVATOR.
No. 290,111. Patented Dec. 11, 1883.
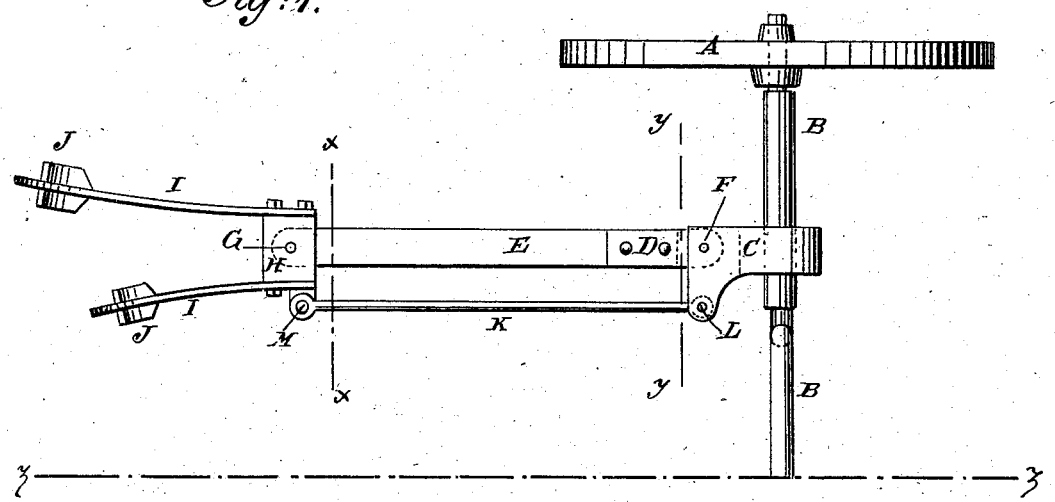
Fig. 1.
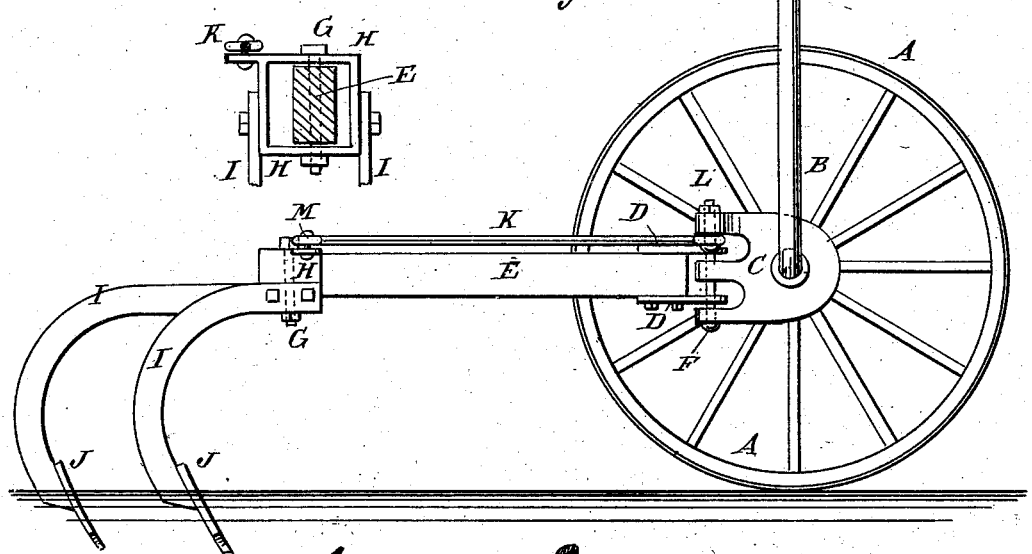
Fig. 3.
Fig. 2.
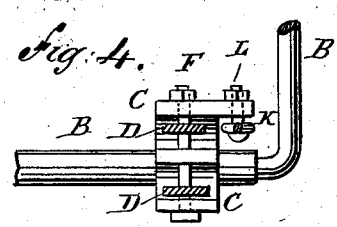
Fig. 4.
WITNESSES:
Chas. Nida.
C. Sedgwick.
INVENTOR:
C. D. Reed
BY Munn & Co.
ATTORNEYS.

UNITED STATES PATENT OFFICE.

CHARLES D. REED, OF POLO, ILLINOIS.

CULTIVATOR.

SPECIFICATION forming part of Letters Patent No. 290,111, dated December 11, 1883.

Application filed August 2, 1883. (No model.)

*To all whom it may concern:*

Be it known that I, CHARLES D. REED, of Polo, in the county of Ogle and State of Illinois, have invented a new and useful Improvement in Cultivators, of which the following is a full, clear, and exact description.

Reference is to be had to the accompanying drawings, forming a part of this specification, in which similar letters of reference indicate corresponding parts in all the figures.

Figure 1 is a plan view of a part of a cultivator to which my improvement has been applied. Fig. 2 is a sectional elevation of the cultivator, taken through the line $z\ z$, Fig. 1. Fig. 3 is a sectional front elevation taken through the line $x\ x$, Fig. 1. Fig. 4 is a sectional rear elevation taken through the line $y\ y$, Fig. 1.

The object of this invention is to keep the shovels of a cultivator at any desired angle with the line of draft, however they may be moved laterally.

A represents a wheel, and B the arched axle, of an ordinary cultivator.

To the horizontal end part of the axle B is secured the coupling C, in the rear end of which are formed recesses to receive the plates D, attached to the upper and lower sides of the forward end of the beam E, where they are secured by a bolt, F; or the beam E can be secured to the coupling C in any suitable manner. The rear end of the beam E is hinged by a bolt, G, in a frame or coupling, H, to the opposite sides of which are rigidly attached the upper ends of the standards I. The standards I are curved to bring their lower ends into proper position to receive the shovels J.

K is a bar or rod placed parallel with the beam H, pivoted at its forward end by a bolt, L, to the coupling C, or to a lug or short arm formed upon or attached to the said coupling. The rear end of the bar K is pivoted by a bolt, M, to the coupling H, or to a lug or short arm formed upon or attached to the said coupling. With this construction, as the standards I and plows J are moved laterally, the bar K will keep the coupling H always parallel with the coupling C, so that the shovels will always be held at the desired angle with the line of draft, and will thus always do good work, however they may be moved laterally.

I do not abandon or dedicate to the public any patentable features set forth herein and not hereinafter claimed, but reserve the right to claim the same either in a reissue of any patent that may be granted upon this application or in other applications for Letters Patent that I may make.

I am aware that it is not new to connect plow-standards with a pivoted coupling, that with the beam, and that with another coupling pivoted to the axle; but What I do claim as new and of my invention is—

In a cultivator, the combination, with a pivoted beam, E, a coupling, C, and standards I I, of the box-coupling H, receiving within it the rear end of the beam on a median pivot, G, receiving on the outside the plow-standards I, and having an arm at one side of the top, in which is pivoted the rod K, parallel to the beam E, as shown, whereby the line of draft will always pass through the center of the beam, whether the rod is on or off the couplings.

CHARLES D. REED.

Witnesses:
JAMES H. JUDSON,
DAVID A. MILLER.